April 11, 1961     L. B. D. ELLIS     2,979,679
APPARATUS OF THE KIND INCLUDING A WAVEGUIDE
Filed Aug. 31, 1956     3 Sheets-Sheet 1
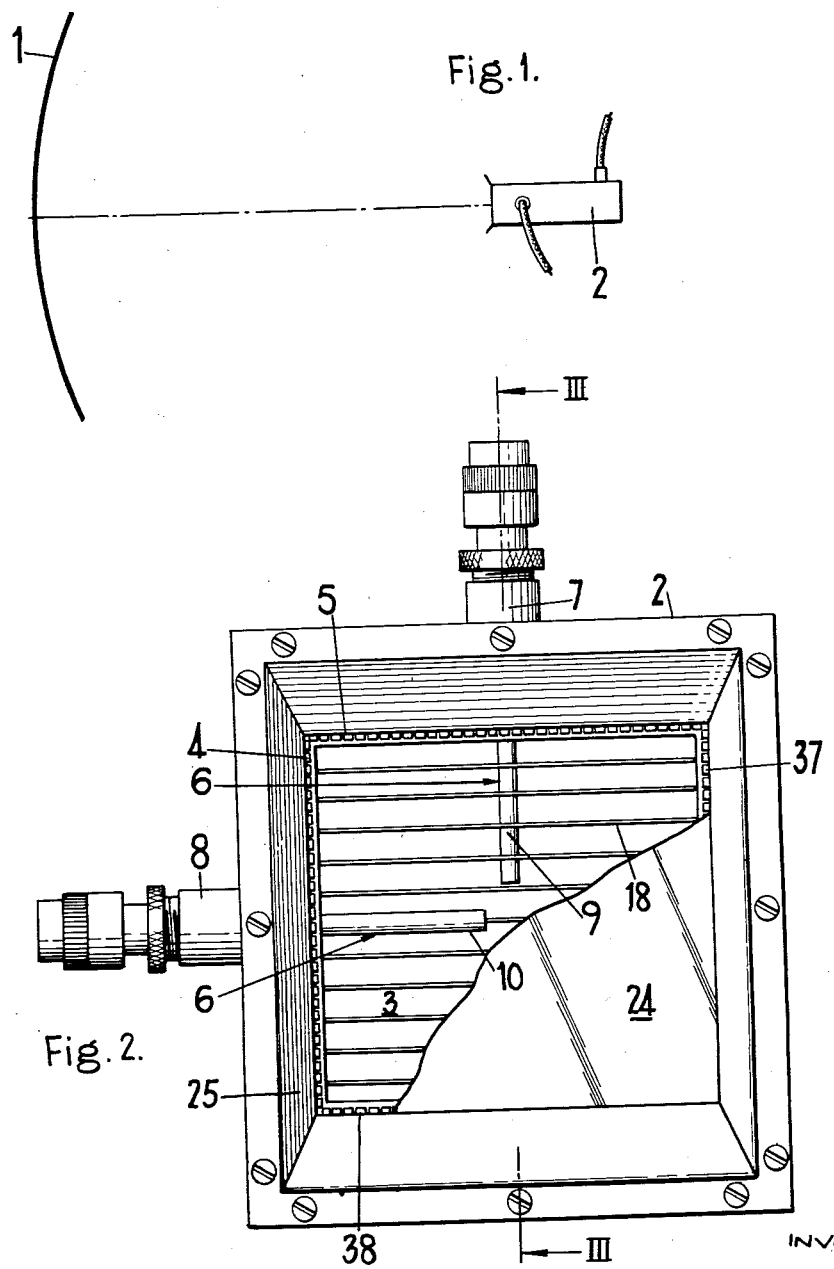
INVENTOR
LESTER BERESFORD DEREK ELLIS
BY
Fischstein, Fischstein & Ottinger
ATTORNEYS April 11, 1961 L. B. D. ELLIS 2,979,679
APPARATUS OF THE KIND INCLUDING A WAVEGUIDE
Filed Aug. 31, 1956 3 Sheets-Sheet 2

INVENTOR
LESTER BERESFORD DEREK ELLIS
BY
Fischstein, Fischstein & Ottinger
ATTORNEYS United States Patent Office 2,979,679
Patented Apr. 11, 1961

2,979,679

APPARATUS OF THE KIND INCLUDING A WAVEGUIDE

Lester Beresford Derek Ellis, Newport, Wales, assignor to The General Electric Company Limited, London, England Filed Aug. 31, 1956, Ser. No. 607,389

Claims priority, application Great Britain Sept. 2, 1955

5 Claims. (Cl. 333—98)

This invention relates to apparatus of the kind including a waveguide.

In British patent specification No. 718,828, there is described a launching device for an aerial system which comprises an open-ended waveguide of rectangular cross-section having two probes that are disposed at right angles to one another so as each to transfer energy between an associated transmission line and the waveguide excited in the $H_{10}$ mode. The two probes thus provide coupling between energy in the waveguide that is polarised in two planes that are at right angles. A plurality of parallel wires are disposed between the two probes so as to form a filter that is adapted to pass electromagnetic energy of that one of said planes of polarisation to which the said probe remote from the open end is capable of coupling but to attenuate electromagnetic energy of the other plane of polarisation. The end of the waveguide remote from the open end is closed by a plunger.

It is found that, in certain circumstances, there is some tendency with the construction of launching device mentioned above for the space in the waveguide between the said filter and the said plunger to be excited in unwanted modes of which possibly the $H_{11}$ mode is the most serious. One object of the present invention is to provide an arrangement in which such spurious excitation is reduced.

According to the present invention, apparatus comprises a waveguide of rectangular cross-section that is terminated at one end, a filter which is disposed within the waveguide and which is formed by a plurality of parallel wires that lie across the waveguide, and a coupling that is adapted to transfer energy between a transmission line and the portion of the waveguide bounded by the termination and the said filter when that portion is excited in the $H_{10}$ mode with a plane of polarisation such that the said energy may pass through the said filter, the said termination being such that over a length of the waveguide at least one dimension of its cross-section tapers away from the said filter.

The taper is preferably in the direction of the electric field when the waveguide is excited in the $H_{10}$ mode as aforesaid but may be in the direction at right angles to the electric field. The said termination may be formed by a planar part that lies perpendicular to the longitudinal axis of the waveguide (and is thus parallel to the said electric field) and another planar part that is inclined to the longitudinal axis, the planes of the two parts intersecting at a line that is parallel to a wall of the waveguide. If the said coupling is a probe that extends into the waveguide from one wall thereof, the line of intersection may be parallel to that wall.

The apparatus may fall within the scope of any claim of British patent specification No. 718,828.

One arrangement of an aerial system that includes a launching device in accordance with the present invention will now be described by way of example with reference to the accompanying drawings in which:

Figure 1 shows diagrammatically the aerial system, which comprises a reflector and a launching device.

Figure 2 shows an end view of the launching device of Figure 1, partially in section.

The aerial system shown in Figure 1 comprises a parabolic or paraboloidal reflector 1 and a launching device 2 which lies on the axis of the reflector 1, the open end of the launching device 2 being directed towards the reflector 1.

This aerial system is required for duplex operation, transmission in one direction being in the band 1750 to 1900 megacycles per second while transmission in the other direction is in the band 1900 to 2050 megacycles per second. The two radiations have their electric fields plane-polarised in planes that are mutually at right angles.

Figure 3:
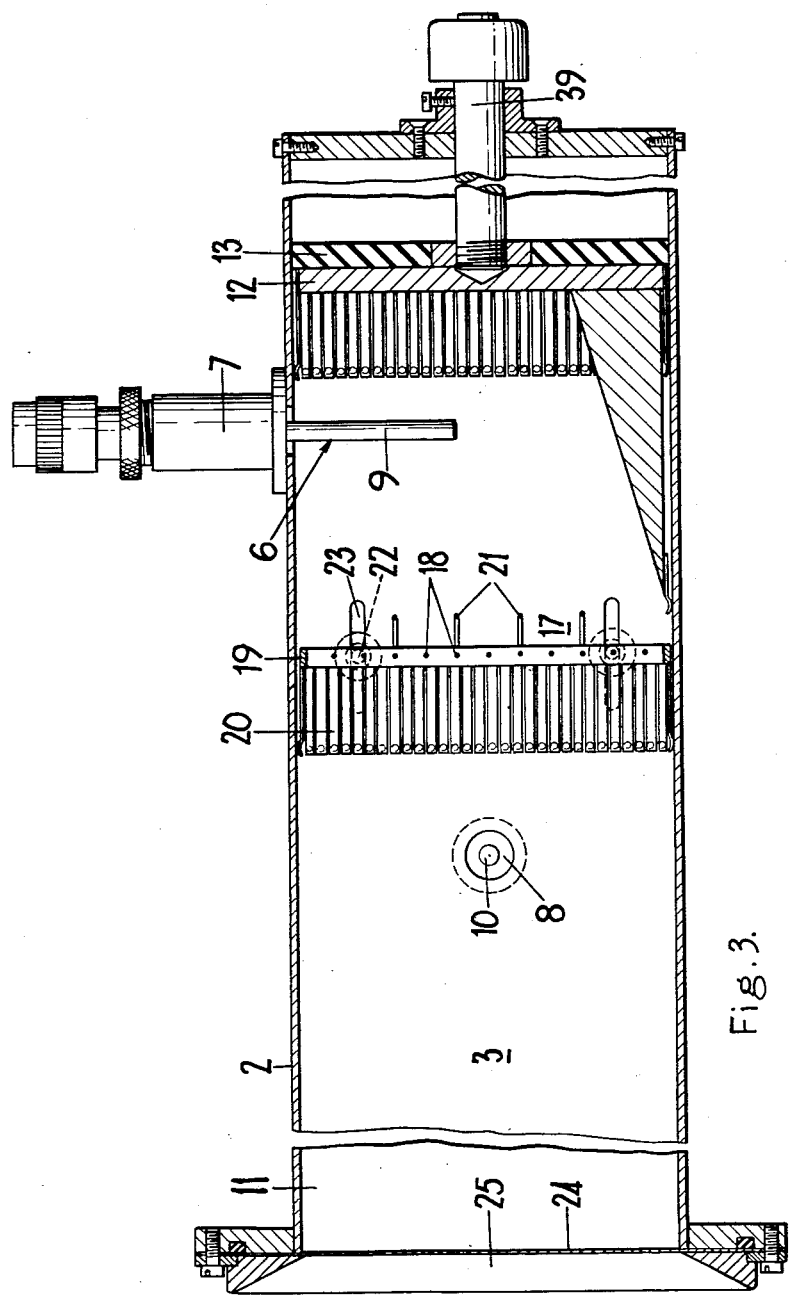
Figure 3 shows a cross-section at the line III—III in Figure 2.

Referring now to Figures 2 and 3, the launching device 2 comprises a waveguide 3 of rectangular cross-section. This waveguide is of copper and its internal dimensions are approximately 3.7 and 4.0 inches. During use, this waveguide 3 will be excited in the $H_{10}$ mode, in two planes that are at right angles, by the transmitted and received radiations. In one case the electric lines of force will be parallel to the wall 4 and in the other case parallel to the wall 5.

Two couplings 6 are provided between the waveguide 3 and two co-axial transmission lines (not shown in Figures 2 and 3) so that in one case the signal to be radiated may be launched into the waveguide 3 while in the other case the received radiation may be fed into the appropriate transmission line. For this purpose connectors 7 and 8 to which the two transmission lines may be connected have their centre conductors extending into the waveguide 3 as probes 9 and 10. These two probes 9 and 10 are spaced a distance apart longitudinally of the waveguide 3 and each extend from a point mid-way across a wall 4 or 5 of the waveguide 3 approximately half way into the waveguide. The two probes 9 and 10 lie parallel to the walls 4 and 5 respectively. In another construction of launching device, the connectors 7 and 8 are omitted and the inner conductors of the two said co-axial transmission lines extend into the waveguide 3 to form the probes 9 and 10.

The end 11 of the waveguide 3 is open while the other end is closed by a moveable plunger 12. The plunger 12, which will be described in detail hereinafter, may be mounted on a disc 13 of lossy material which is a close fit in the waveguide 3.

A filter 17, formed by eleven parallel wires 18, is disposed between the two probes 9 and 10. These wires 18 are mounted on a frame 19 that is moveable longitudinally of the waveguide 3 and which carries a plurality of fingers 20 which bear against the four walls of the waveguide 3 so as to make electrical contact therewith. These wires 18 are equally spaced and lie parallel to the probe 10. Four additional wires 21 are also carried by the frame 19, these additional wires 21 being parallel to and in the shadow of alternate wires 18 (that is to say these wires 21 lie directly behind the appropriate wires 18 relative to the open end 11 of the waveguide 3).

The two probes 10 and 9 are disposed approximately a half wavelength and a wavelength from the open end 11 of the waveguide 3 respectively at the frequencies at which the aerial system is to be used and it will be appreciated that the filter 17 acts as a reflector to the probe 10 for the electromagnetic energy in the waveguide 3 associated with that probe: the position of the wires 18 forming this filter 17 may therefore be adjusted in order to provide maximum coupling between the waveguide connected to the probe 10 and its associated transmission line. In fact the frame 19 is provided with locating pegs 22 which may slide in slots 23 in the walls of the waveguide 3.

The filter 17 has substantially no effect on electromagnetic energy in the waveguide in the other plane of polarisation so that there is substantially no attenuation between the probe 9 and the open end 11 of the waveguide 3 to energy polarised in that other plane. Maximum coupling between the transmission line connected to the probe 9 and the waveguide 3 may therefore be effected by adjusting the position of the plunger 12. A mechanism 39 is provided for making this adjustment. In practice the filter 17 is approximately a quarter wavelength behind the probe 10 while the plunger 12 is approximately a quarter wavelength behind the probe 9.

It has been found that the additional wires 21 have the effect of altering the resonant frequency of the cavity formed between the filter 17 and the plunger 12 so that spurious resonances which might otherwise be produced are obviated. The additional wires 21 also assist the filtering action of the wires 18. The open end 11 of the waveguide 3 is closed by a mica window 24 and is connected to a flare 25 which is directed towards the parabolic or paraboloidal deflector of the aerial system. The launching device may be used with the inside of the waveguide raised to a pressure above atmospheric.

Figure 5:
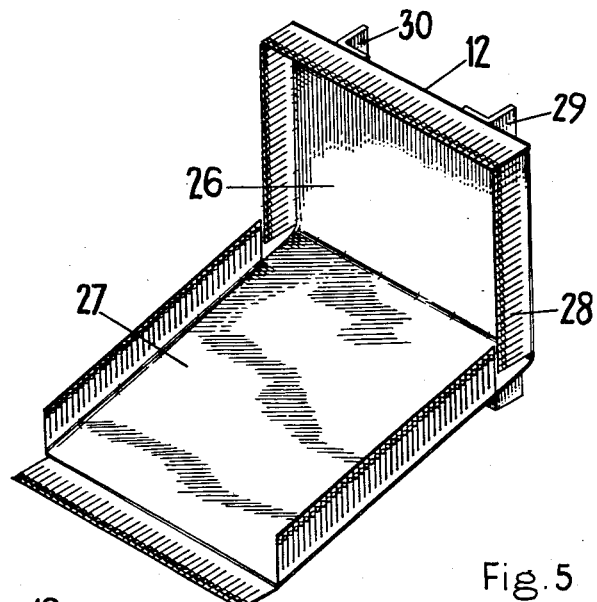
Figure 5 shows a perspective view of part of the launching device.
Figure 4:
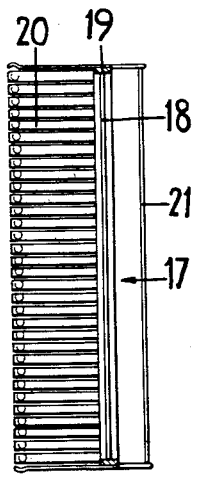
Figure 4 shows a plan view of part of the launching device.

The plunger 12 will now be described in detail with reference to Figure 5.

The plunger 12 is formed from a rectangular piece of sheet brass that is bent so as to provide two planar parts 26 and 27 that are both rectangular. The angle between the planar parts 26 and 27 is of the order of 110°. The plunger 12 is mounted so that the smaller planar part 26 lies perpendicular to the axis of the waveguide 3 and the free edges of this part are each provided with a plurality of beryllium-copper fingers 28 which bear against the three walls 4, 5 and 37 of the waveguide 3. The larger planar part 27 is thus inclined at an angle to the longitudinal axis of the waveguide and its free edges are similarly provided with fingers 28 that bear against the walls 4, 37 and 38 of the waveguide 3. The plunger 12 is provided with two brass members 29 and 30 of angle cross-section that are attached to the rear of the smaller planar part 26. The members 29 and 30 are of the same length and are parallel to one another and to the wall 4 of the waveguide 3, being of such a length that the smaller planar part 26 is maintained at right angles to the longitudinal axis of the waveguide 3 when the plunger 12 is in position.

The arrangement of the plunger 12 in the waveguide 3 may be seen in Figure 3, the fingers that are connected to that edge of the small planar part 26 that is parallel to the line of intersection of the planes of the two parts 26 and 27 bear against the wall 5 of the waveguide 3 through which projects the probe 9 nearer to the plunger 12. The fingers connected to the corresponding edge of the other planar part 27 similarly bear against the opposite wall 38 of the waveguide 3 and the planar part 27 extends under the probe 9.

In the construction described above the said plunger 12 is capable of longitudinal movement for the purpose of finding an optimum position but it is to be understood that this feature is not essential to the present invention since the said piece of brass may be rigidly secured to the waveguide walls, for example by soldering right round the edges of the piece, in which case said fingers and the members 29 and 30 would be unnecessary. Moreover instead of the waveguide termination being formed by a unitary piece of metal, it may be fabricated from two separate pieces that constitute the said planar parts 26 and 27 respectively.

Figure 6:
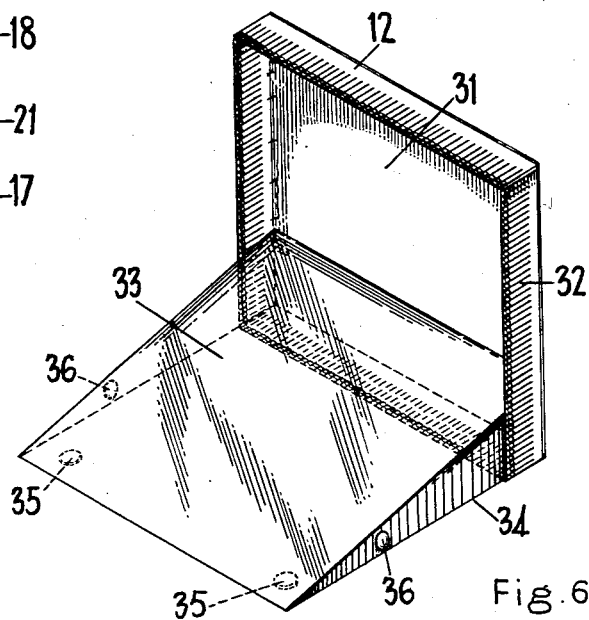
Figure 6 shows a perspective view of an alternative construction of part of the launching device.

An alternative construction of a moveable plunger 12 that provides substantially the same waveguide termination is shown in Figure 6 and comprises a rectangular brass plate 31 which is a loose fit in the waveguide 3 and while lies at right angles to the longitudinal axis of the waveguide 3. A plurality of fingers 32 as previously described are provided along each edge of the plate 31 so as to bear against and thereby make electrical connection with the four walls of the waveguide 3. Attached to the plate 31, for example, by screws, is a wedge-shaped brass member 33 that projects into the waveguide 3. One rectangular face 34 of this member 33 lies parallel to, but spaced a small distance from, that wall of the waveguide 3 that is opposite the one through which the probe 9 projects. For this purpose two studs 35 of insulating material are fixed to the face 34 of the member 33 in the region of the thin part of the wedge-shaped member 33, the studs 35 serving to support the wedge-shaped member 33 from the adjacent wall of the waveguide 3. Two similar studs 36 are fixed one to each of the triangular faces of the wedge-shaped member 33 so as to space these two faces from the adjacent walls of the waveguide 3 to which they are parallel.

If the plunger 12 is not to be moveable but is to be rigidly attached to the walls of the waveguide 3 then the studs 35 and 36, and the fingers 32, may not be necessary.

As an alternative the aerial system described need not have a reflector and the open end 11 of the launching device may be directed towards a lens or may be provided with a flare.

I claim:

1. An aerial system comprising a launching device formed by a waveguide of rectangular cross-section which is terminated at one end, a filter which is disposed within the waveguide and which is formed by a plurality of parallel elongated members which lie across the waveguide, and a coupling which is adapted to transfer energy between a transmission line and the portion of the waveguide bounded by the termination and said filter when that portion of the waveguide is excited in the $H_{10}$ mode with a plane of polarization such that said energy may pass through said filter, said termination being formed of electrically-conducting material and comprising a planar part which lies perpendicular to the length of the waveguide and another planar part which is inclined to the length of the waveguide so that over a length of the waveguide at least one dimension of its cross-section tapers away from said filter, the two said planar parts of the termination intersecting at a line which is parallel to a wall of the waveguide, said line forming a portion of the interior surface of said waveguide termination.

2. An aerial system according to claim 1 wherein said coupling is a probe which extends into the waveguide from one wall thereof, said line at which the two said planar parts of the termination intersect being parallel to said wall from which the probe projects.

3. An aerial system comprising a launching device formed by a waveguide of rectangular cross-section which is terminated at one end, the waveguide having first and second walls the planes of which are parallel, a third wall the plane of which is at right angles to the plane of said first wall, a planar terminating member the plane of which is at right angles to the plane of said first and third walls, and a fourth wall made up of a first planar part the plane of which is parallel to the plane of said third wall, said fourth wall being further made up of a second planar part which is situated adjacent said terminating member and the plane of which is inclined at an angle to the plane of said third wall such that one dimension of the cross-section of the waveguide decreases in the direction of said terminating member over the length of said second planar part, said second planar part and said terminating member intersecting at a line which is parallel to the wall of the waveguide, said line forming a portion of the interior surface of the waveguide termination, a filter which is disposed within the waveguide and which is formed by a plurality of parallel wires that lie across the waveguide, and a coupling which is adapted to transfer energy between a transmission line and the portion of the waveguide bounded by said terminating member and said filter when said portion of the waveguide is excited in the $H_{10}$ mode with a plane of polarization such that said energy may pass through said filter.

4. An aerial system according to claim 3 wherein said coupling is a probe which projects into the waveguide from said third wall at a point opposite said second planar part of the fourth wall.

5. An aerial system according to claim 3 which also includes a parabolic reflector, the end of the waveguide remote from said terminating member being directed towards said parabolic reflector.

References Cited in the file of this patent

UNITED STATES PATENTS

| | | |
|---|---|---|
| 2,433,011 | Zaleski | Dec. 23, 1947 |
| 2,433,817 | Rochester | Dec. 30, 1947 |
| 2,560,536 | Althouse | July 17, 1951 |
| 2,565,112 | Altar et al. | Aug. 21, 1951 |
| 2,600,186 | Banos | June 10, 1952 |
| 2,633,493 | Cohn | Mar. 31, 1953 |
| 2,701,861 | Andrews | Feb. 8, 1955 |
| 2,709,240 | Gibson | May 24, 1955 |
| 2,766,431 | Barker | Oct. 9, 1956 |
| 2,812,500 | Riblet | Nov. 5, 1957 |
| 2,812,503 | Riblet et al. | Nov. 5, 1957 |

FOREIGN PATENTS

| | | |
|---|---|---|
| 645,508 | Great Britain | Nov. 1, 1950 |
| 663,820 | Great Britain | Dec. 27, 1951 |
| 718,828 | Great Britain | Nov. 24, 1954 |

OTHER REFERENCES

Electronics, September 1954, "Microwave Duplexing," by D. J. Le Vine et al. pages 162–164.